May 4, 1965  C. L. RAUTBORD ETAL  3,181,420
COPYING MACHINE
Filed May 23, 1963  9 Sheets-Sheet 1
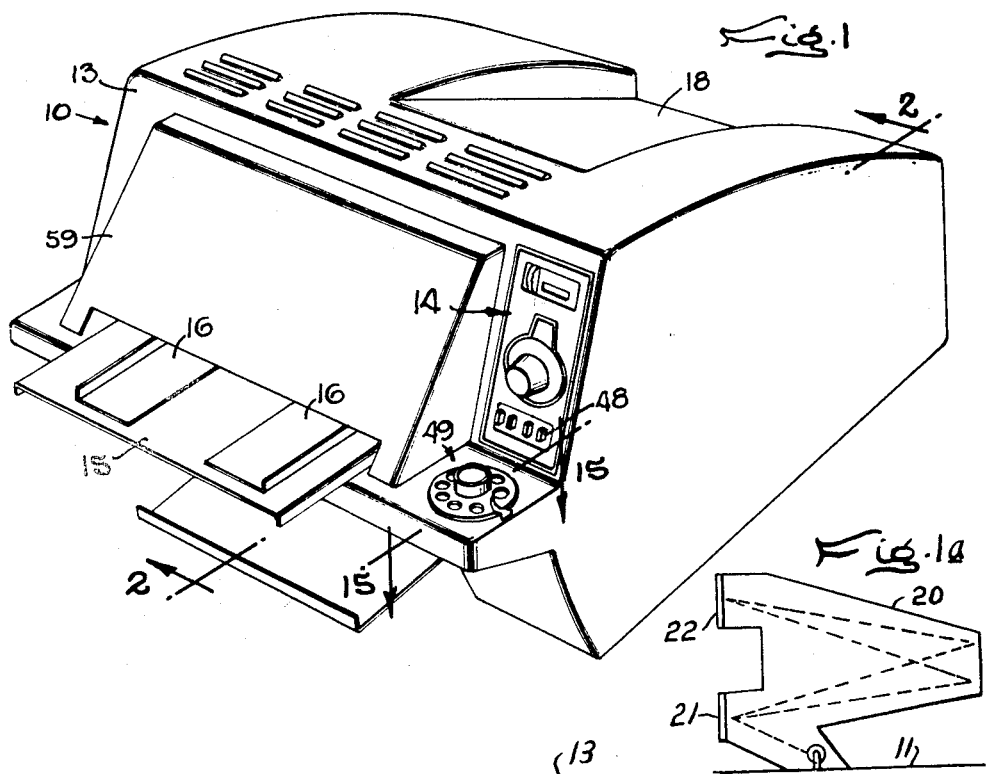
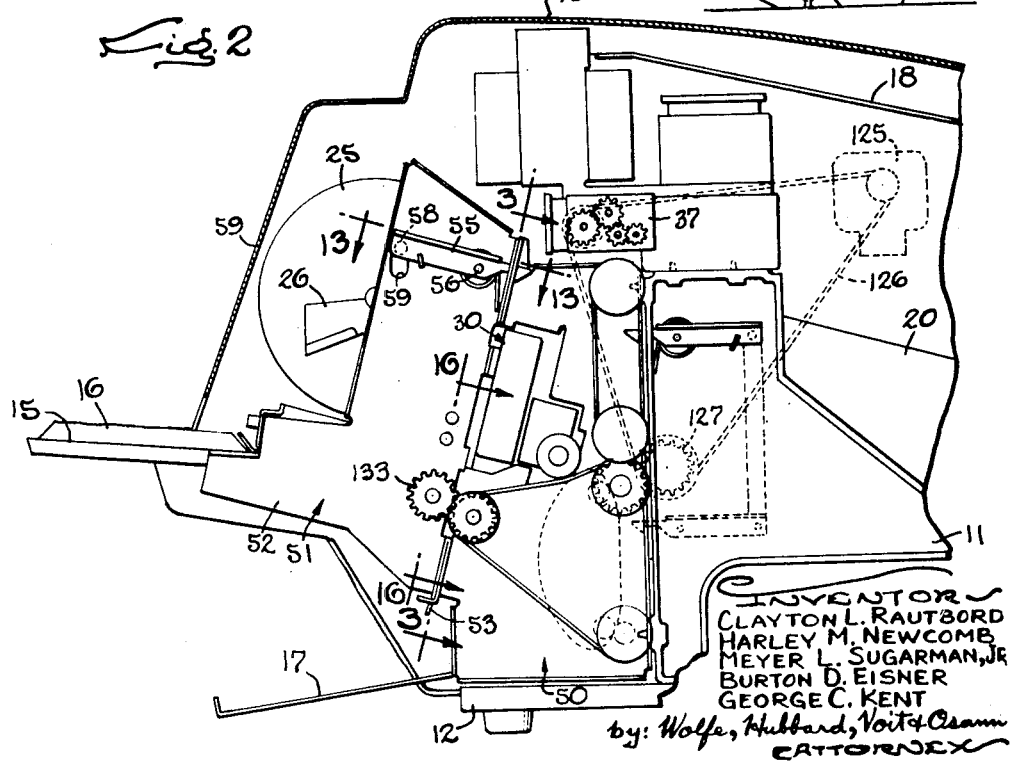
INVENTORS
CLAYTON L. RAUTBORD
HARLEY M. NEWCOMB
MEYER L. SUGARMAN, JR
BURTON D. EISNER
GEORGE C. KENT
by: Wolfe, Hubbard, Voit & Osann
ATTORNEYS

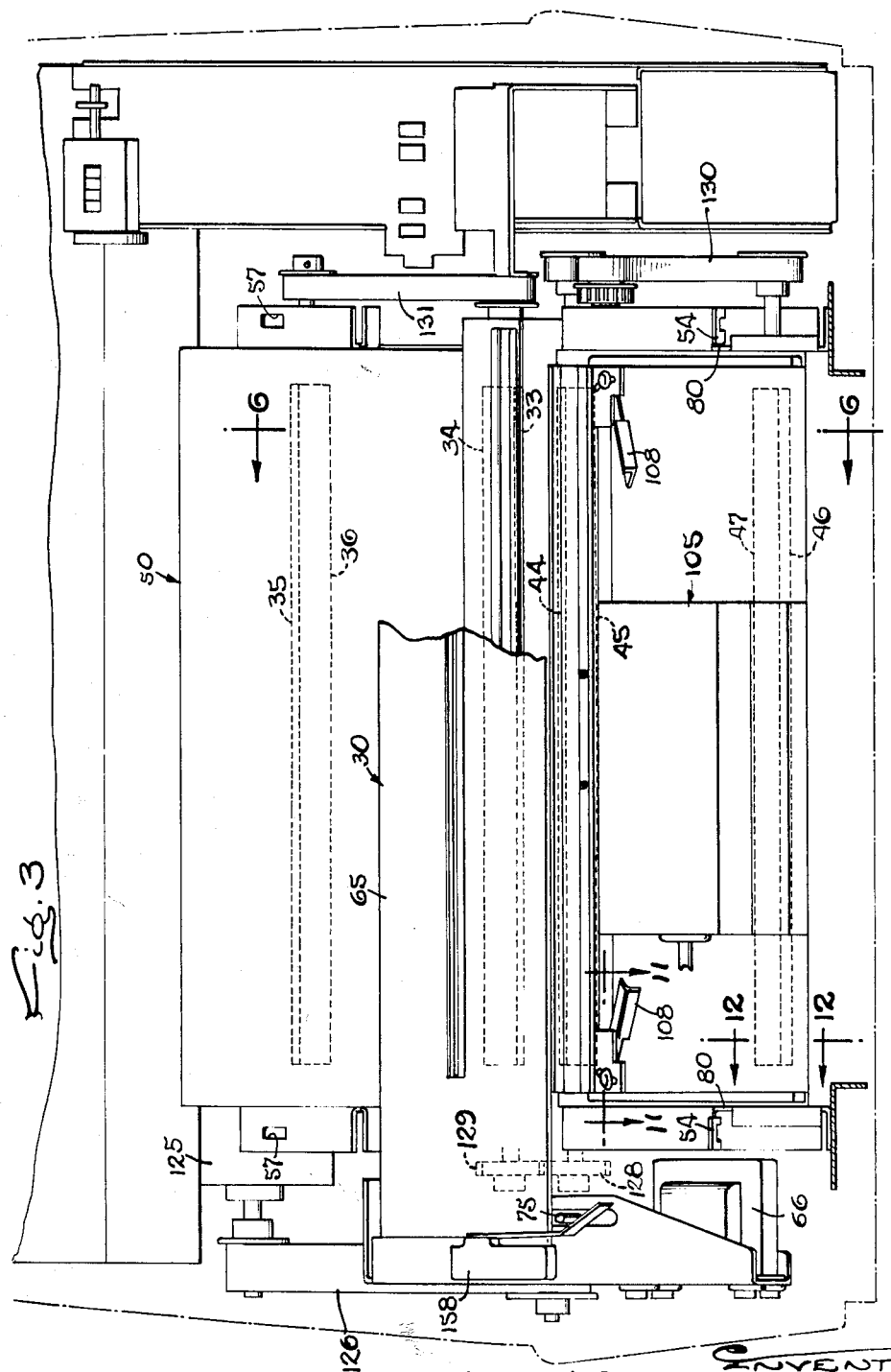

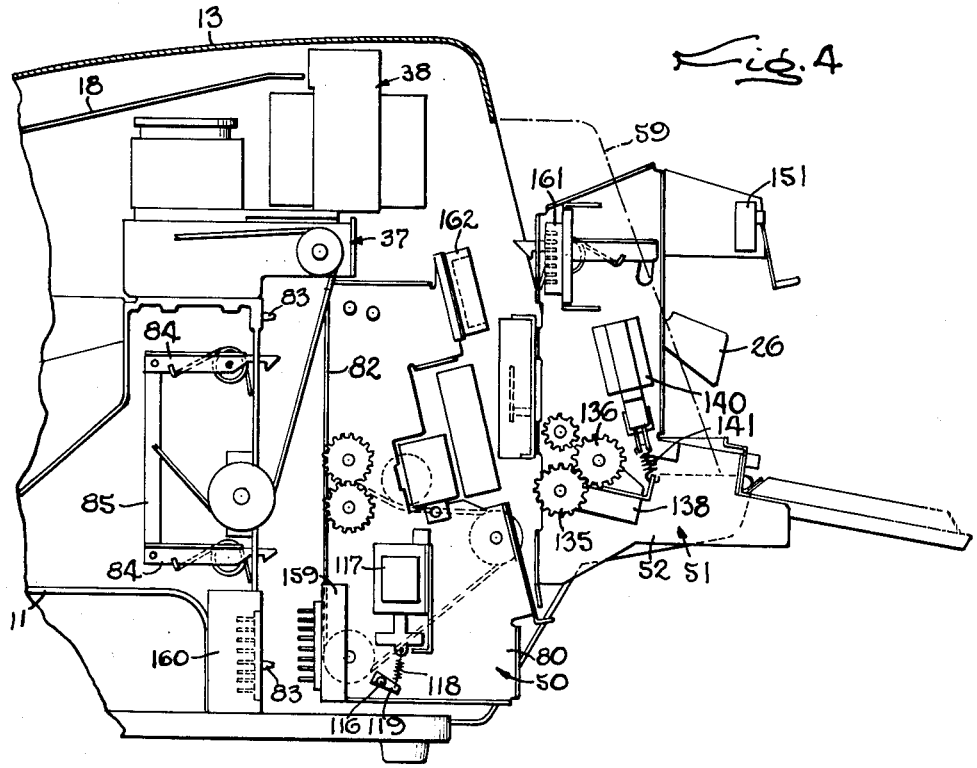
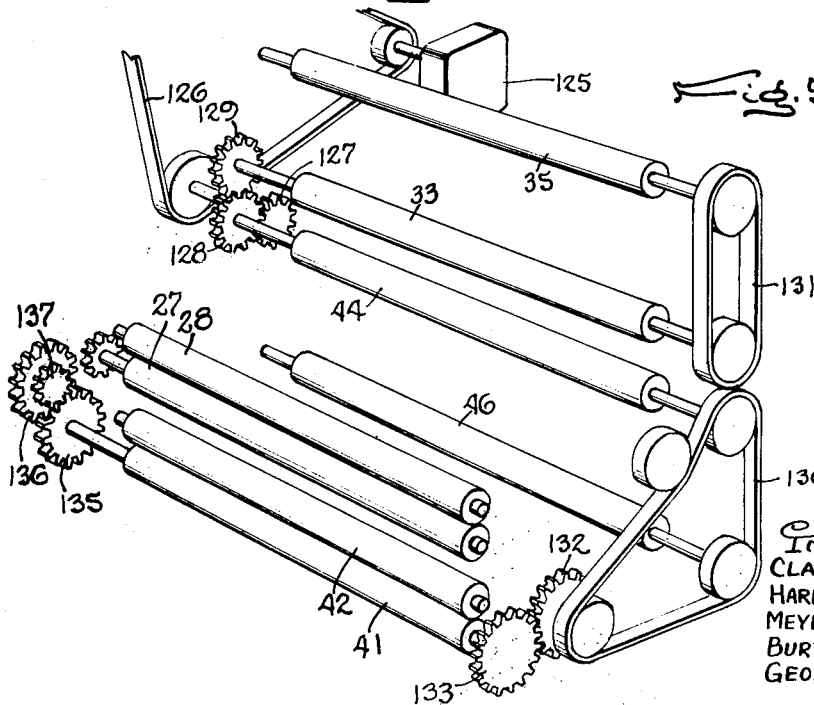

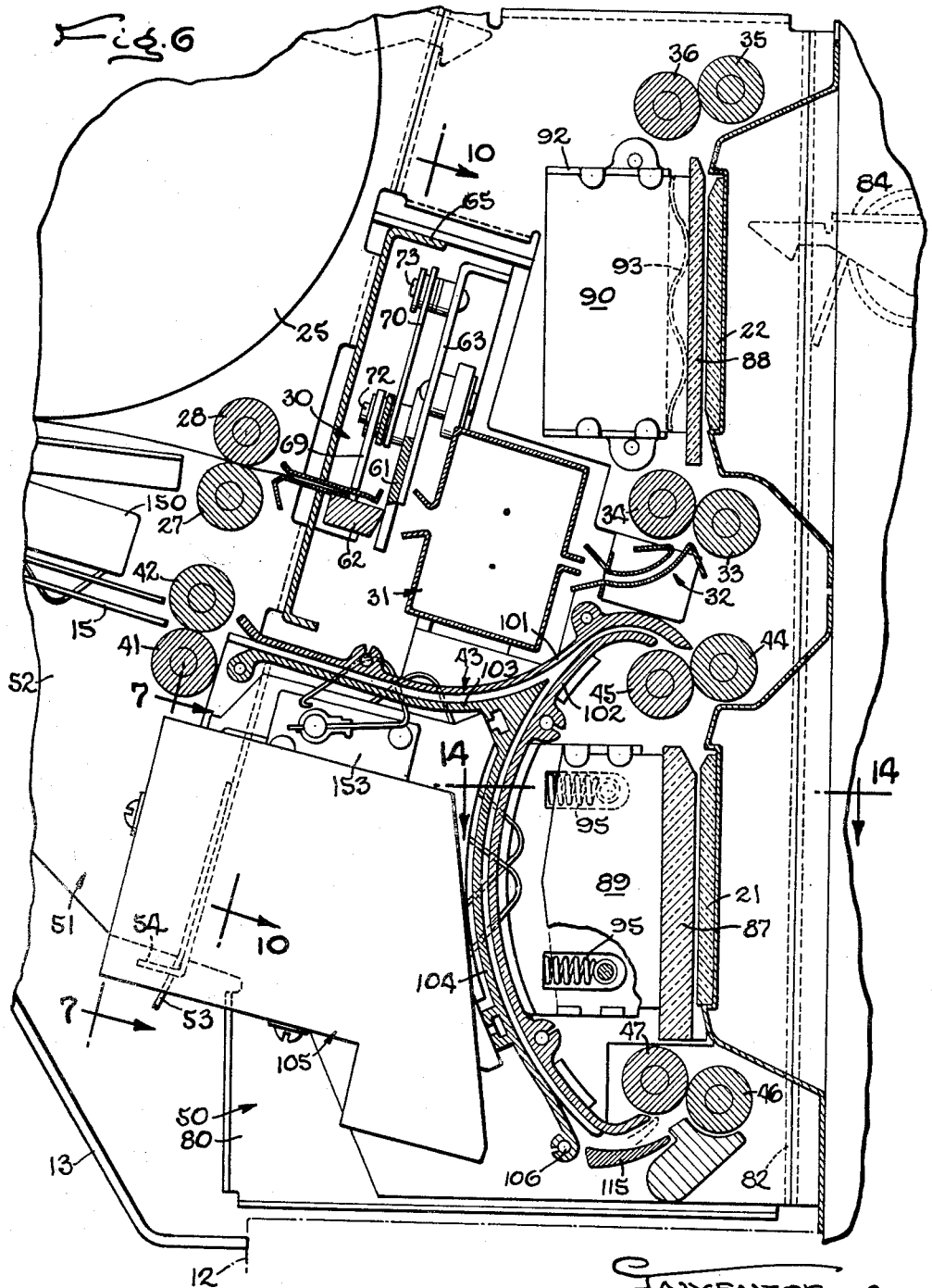

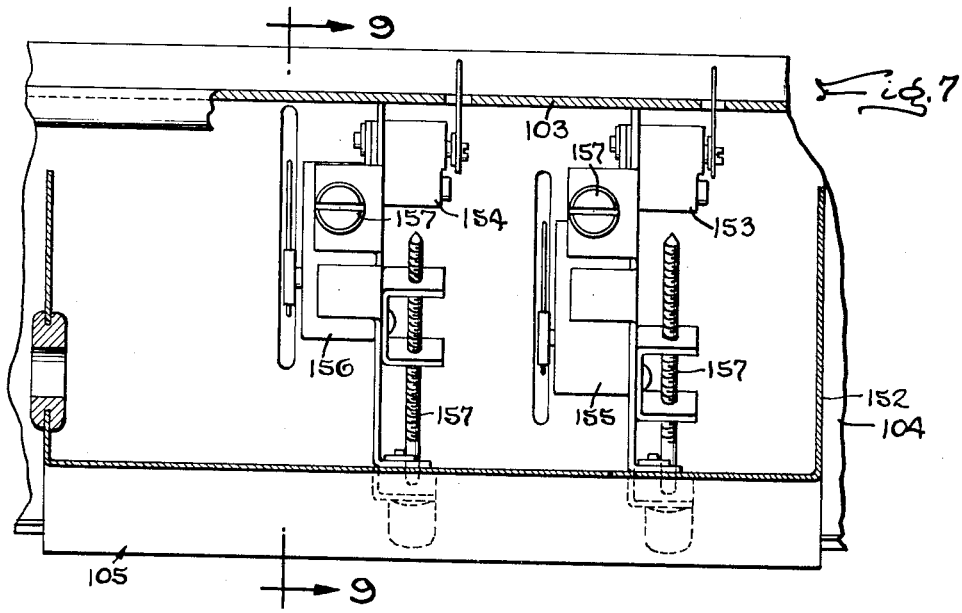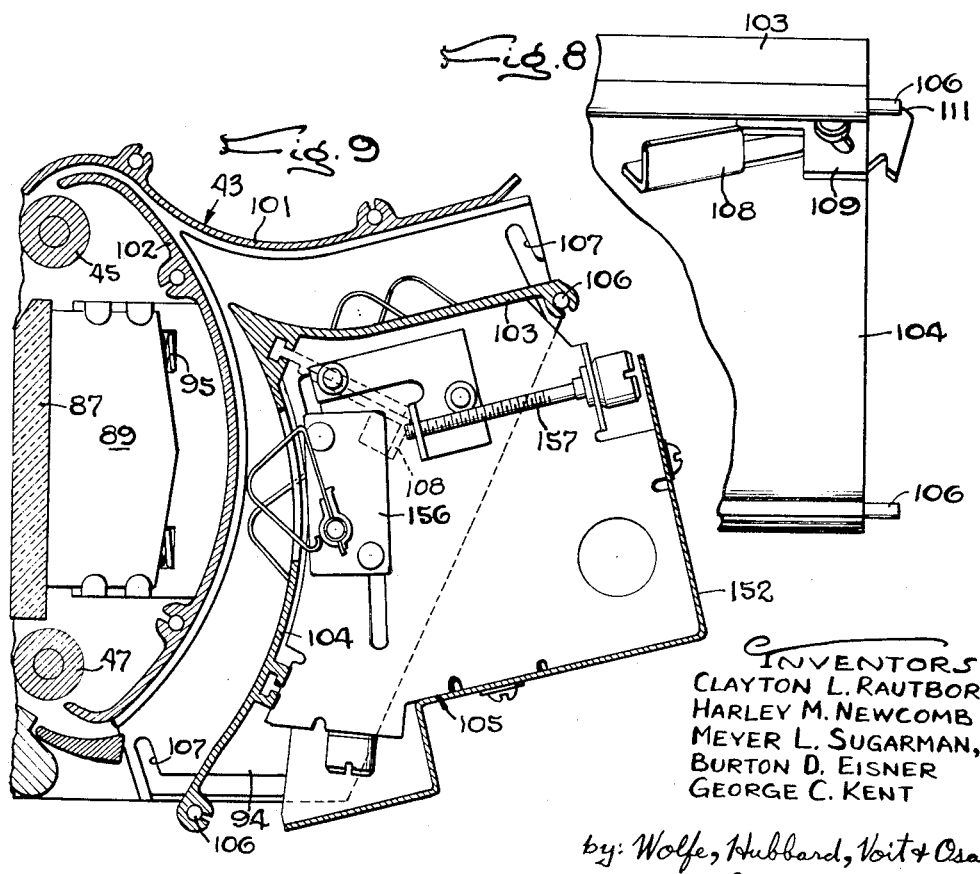

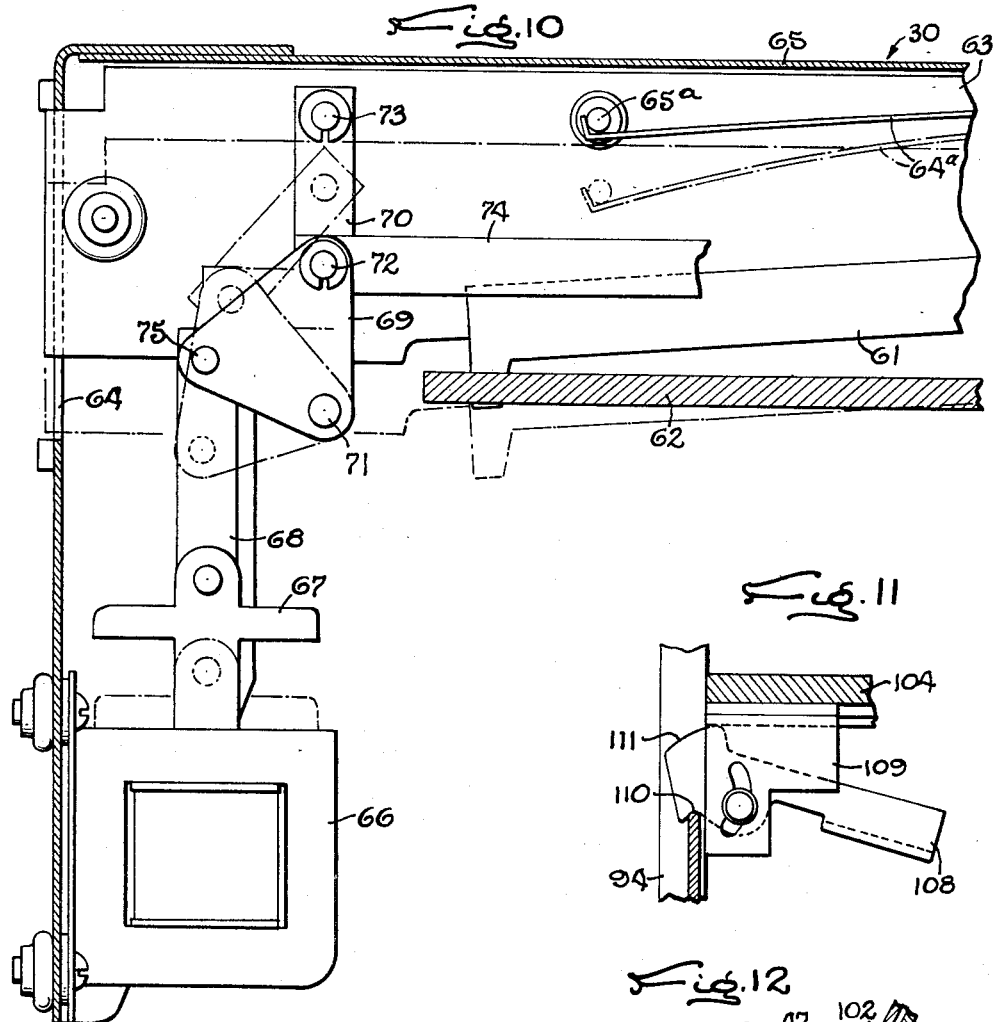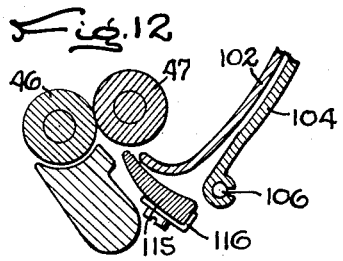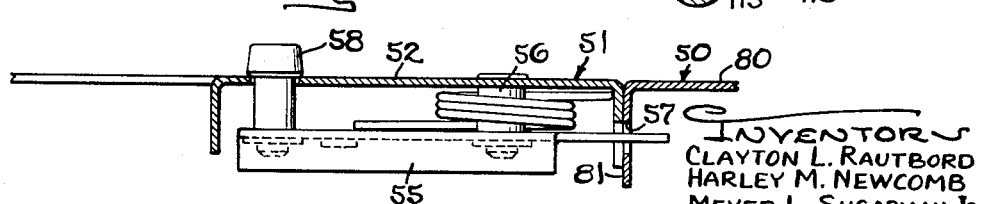

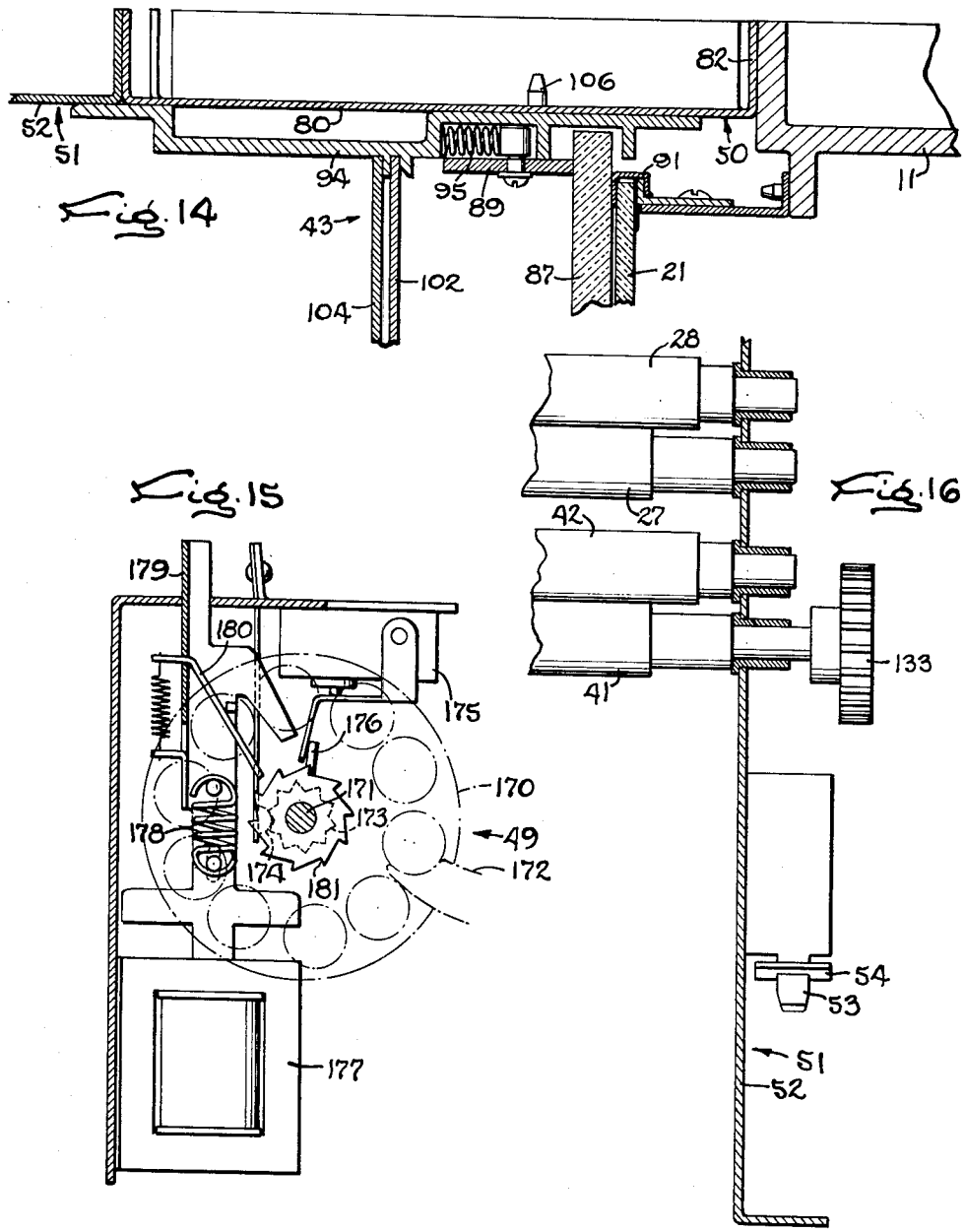

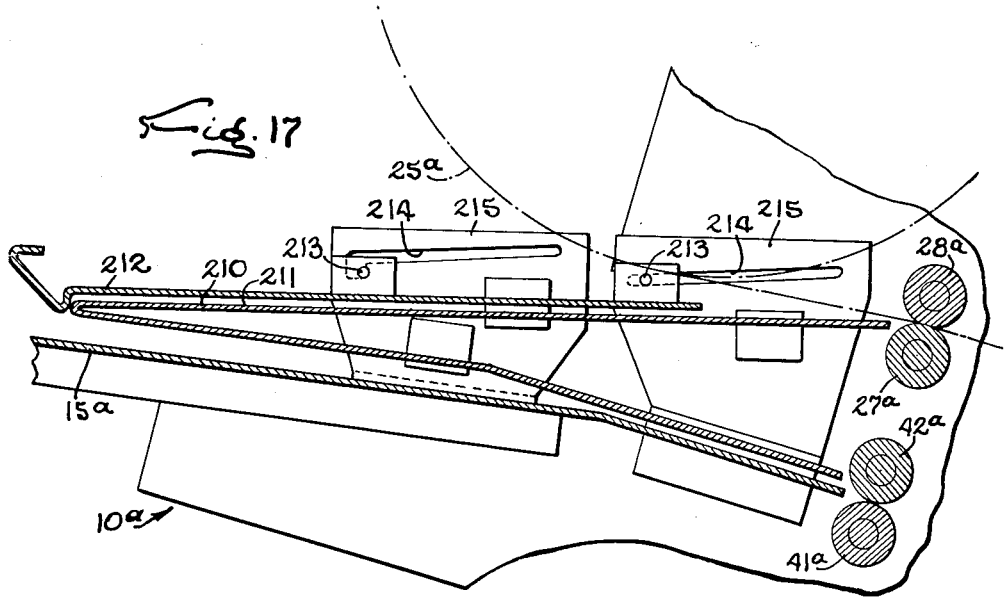
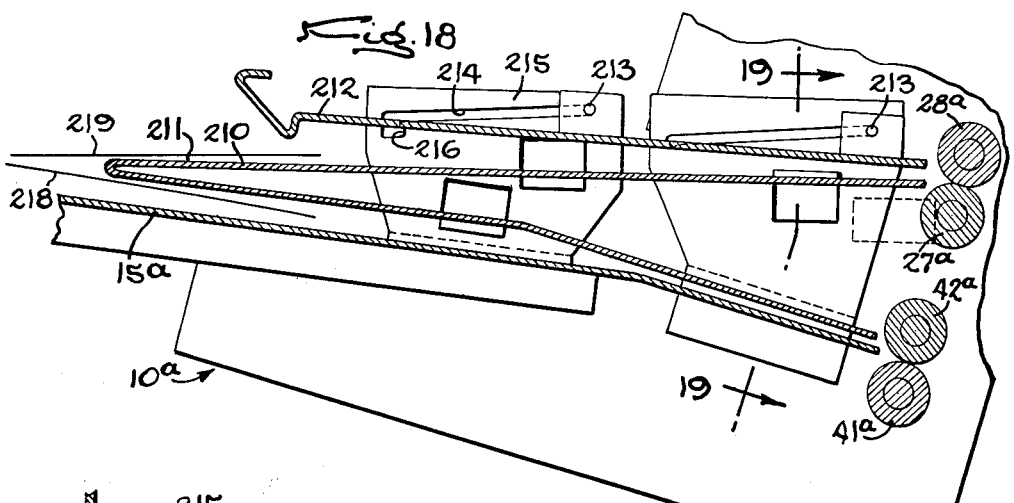
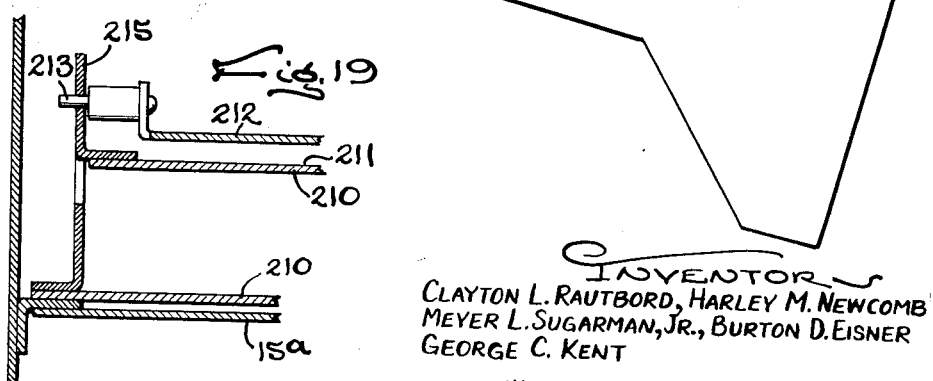

Fig. 20

United States Patent Office 3,181,420
Patented May 4, 1965

3,181,420
COPYING MACHINE
Clayton L. Rautbord, Glencoe, Harley M. Newcomb, Bensenville, Meyer L. Sugarman, Jr., Glencoe, Burton D. Eisner, Highland Park, and George C. Kent, Elmhurst, Ill., assignors to American Photocopy Equipment Company, Evanston, Ill., a corporation of Illinois
Filed May 23, 1963, Ser. No. 282,682
7 Claims. (Cl. 88—24)

This invention relates to electrophotographic copying machines and concerns, more particularly, a copy machine of this kind capable of making multiple copies of an original sheet.

Electrophotographic printing, as employed in compact office copying machines, involves uniformly charging a copy sheet, exposing the sheet to produce a latent image by dissipating the charge from light struck areas, and developing the image by applying and fixing a pigmented powder which adheres to the remaining charged areas. An effective desk size copy machine utilizing electrophotographic printing is disclosed in application Serial No. 853,123, filed November 16, 1959, now Patent No. 3,088,386, issued May 7, 1963. In this design, compactness is in part attained through exposing the copy paper by uniformly scanning both the original to be copied and the copy paper as they move through illuminating and exposing stations, respectively, so that an image is reflected from the original to the copy paper in flowing increments. While this arrangement permits rather large copies to be made by a compact machine, the making of a number of copies from the the same original requires refeeding the original through the illuminating station for each copy desired. It is toward the making of multiple copies in a machine of this kind that is the concern of the present invention.

The general aim of the invention is to provide a compact electrophotographic copying machine capable of automatically making multiple copies of an original and that will, moreover, repeat the copying procedure indefinitely so long as the supply of copy paper lasts. It is a related object to provide a machine of the foregoing character with a simple dial device permitting the machine operator to "dial" the number of copies desired.

Another object is to provide a machine of the above type that is economical to operate in that copies are the same size as the original and with there being no wasted copy paper between repeated copies of the same original.

A further object is to provide a machine as characterized above that is quite reliable in operation. Collaterally, and more specifically, it is an object to control a machine of this type so that originals which are too long will not be accepted for repeat copying, and copy sheets which are too short for processing will not be cut from the copy paper supply roll.

It is also an object to provide a machine as described above which can be conveniently and easily serviced and maintained, particularly in that the mechanism is arranged in readily separable sub-assemblies.

A more detailed object is to provide a machine of the above type with a rapid acting, solenoid operated knife for severing copy paper into proper lengths without jarring or vibrating the machine so as to preclude the making of good, accurate copies.

Other objects and advantages of the invention will become apparent upon reading the following detailed description and upon reference to the drawings, in which:

FIGURE 1 is a perspective of a copying machine embodying the present invention;

FIG. 1a is a schematic of the optical system in the FIG. 1 machine.

FIG. 2 is a fragmentary section, slightly enlarged, taken approximately along the line 2—2 in FIG. 1;

FIG. 3 is an enlarged section taken approximately along the line 3—3 in FIG. 2;

FIG. 4 is similar to FIG. 2 but showing the opposite side of the machine and with certain sub-assemblies moved into disassociated positions;

FIG. 5 is a somewhat schematic perspective of the drive arrangement in the machine of FIG. 1;

FIG. 6 is an enlarged fragmentary section taken approximately along the line 6—6 in FIG. 3;

FIG. 7 is an enlarged fragmentary section taken approximately along the line 7—7 in FIG. 6;

FIG. 8 is a view similar to FIG. 7 but showing one end of the structure illustrated;

FIG. 9 is a section taken along the line 9—9 in FIG. 7 and showing a portion disassociated from the remaining structure;

FIG. 10 is an enlarged fragmentary section taken approximately along the line 10—10 in FIG. 6;

FIG. 11 is an enlarged fragmentary section taken approximately along the line 11—11 in FIG. 3;

FIG. 12 is an enlarged fragmentary section taken approximately along the line 12—12 in FIG. 3;

FIG. 13 is an enlarged fragmentary section taken approximately along the line 13—13 in FIG. 2;

FIG. 14 is an enlarged fragmentary section taken approximately along the line 14—14 in FIG. 6;

FIG. 15 is an enlarged fragmentary section taken approximately along the line 15—15 in FIG. 1;

FIG. 16 is an enlarged fragmentary section taken approximately along the line 16—16 in FIG. 2;

FIG. 17 is a fragmentary section showing a slight modification of a machine basically similar to that illustrated in FIG. 1;

FIG. 18 is similar to FIG. 17 and shows a shiftable part in an alternate position;

FIG. 19 is a fragmentary section taken approximately along the line 19—19 in FIG. 18; and FIG. 20 is a wiring diagram showing the control circuit of the machine illustrated in FIG. 1.

While the invention will be described in connection with certain preferred embodiments, it will be understood that we do not intend to limit the invention to those embodiments. On the contrary, we intend to cover all alternatives, modifications and equivalents as may be included within the spirit and scope of the invention as defined by the appended claims.

*General review of structure and operation*

Turning first to FIGS. 1 and 2, there is shown an electrophotographic copying machine 10 including a main frame 11 secured to a base 12 and enclosed by a housing 13. A control panel 14 is disposed at the right front side of the machine adjacent to an original sheet inlet table 15 carrying a pair of laterally adjustable, original sheet guides 16. Original sheets to be copied are fed to the machine over the table 15, and the original is subsequently discharged into a return tray 17 while the copy is fed to a copy receiving platform 18 formed as a portion of the housing 13.

The machine 10 includes an optical system 20 which includes an illuminating lamp, a lens and mirror system, and a pair of spaced windows 21 and 22 (see FIGS. 1a, 6) which define, respectively, an illuminating station and an exposing station. For further details concerning the optical system 20, reference may be had to the above identified patent.

The machine 10 handles copy paper in the form of a roll 25 which is journalled in a pair of brackets 26 (see FIGS. 2 and 4). A web of paper is fed from the roll 25 by a pair of driven rollers 27 and 28 (see FIG. 6) which feeds the paper, successively, through a copy paper knife 30, a charging unit 31, and a direction changing guide 32 that channels the paper between a pair of driven rollers 33 and 34. The rollers 33, 34 propel the paper through the exposing station adjacent the window 22 to another pair of driven rollers 35 and 36 which propel the paper upwardly through a developing unit 37 and a fixing unit 38, from which the copy is directed to the copy receiving platform 18. For further details as to construction and operation of the developing unit 37 and the fixing unit 38 reference may again be had to the above identified application.

The original sheet is received from the inlet table 15 by a pair of driven rollers 41 and 42 which propels the original into an original sheet path defined by a guide structure 43 that leads to another pair of driven rollers 44 and 45. The rollers 44, 45 propel the original sheet through the exposing station adjacent the window 21 to a pair of driven rollers 46, 47 which either discharge the original sheet or recycle it back to the rollers 44, 45.

As is more completely explained in the above identified Patent No. 3,088,886, the copy paper is electrostatically charged as it passes through the unit 31 and the copy paper sheet and the original sheet move in unison through, respectively, the exposing station adjacent the window 22 and the illuminating station adjacent the window 21. The optical system 20 is effective to reflect the image on the original sheet to the correspondingly traveling copy sheet and the latent image which is thus produced is developed by the application of powder in the unit 37 and fixed as the copy sheet passes through the unit 38.

Pursuant to the invention, the copy paper sheets are severed from the web of the roll 25 in lengths equal to the length of the original being copied, and the guide structure 43 defines a closed loop path for recirculating the original sheet back through the illuminating station. In this way, copy after copy may be made from the original, each equal to the size of the original sheet. By operating a switch 48 on the control panel 14, the machine will continue to produce copies indefinitely so long as the supply of copy paper lasts. Alternatively, a dial mechanism 49 may be manipulated by the machine operator to select any desired number of copies from two to ten. Upon producing the selected number of copies, the machine will turn itself off and discharge the original sheet.

Copy transport sub-assembly

In keeping with the invention, the machine 10 includes an original transport sub-assembly 50 and a copy transport sub-assembly 51 each releasably locked relative to the main frame 11 and readily separable from the machine as a whole. Considering first the copy transport sub-assembly 51, it includes a pair of side plates 52 on which are mounted the copy paper roll supporting brackets 26, the original sheet inlet table 15 and the pairs of driven rollers 27, 28 and 41, 42. The side plates 52 are held rigidly in spaced relation by the table 15 at the front end of the sub-assembly 50 and by the copy paper knife 30 which extends between the side plates 52 at the rear or innermost end of the sub-assembly.

To secure the sub-assembly 51 in place, the side plates 52 are formed with bayonet lugs 53 which fit within slotted tabs 54 formed on the original transport sub-assembly 50 (see FIGS. 4, 6 and 16). In addition, the side plates 52 carry biased latches 55 that are pivoted on studs 56 secured to the side plates 52 (see FIG. 13) and which are received within slots 57 formed in the original transport sub-assembly 50. Preferably, the end of the latches 55 carry thumb knobs 58 which pass through slots 59 in the side plates 52 so that the operator may conveniently grip the roll brackets 26 as handles and, by placing his thumbs on the knobs 58, release the latches 55 and lift the sub-assembly 51 forwardly and upwardly clear of the original transport sub-assembly 50 and the machine 10. The sub-assembly 51 is easily replaced by sliding the lugs 53 into the slotted tabs 54 and pivoting the sub-assembly against the original transport sub-assembly 50 until the latches 55 snap into position.

To provide convenient access to the sub-assemblies 50, 51, the machine housing 13 includes a removable door 59 which permits the sub-assemblies to be easily inspected and removed from the remainder of the machine.

Copy paper knife

The knife 30 includes a slicing blade 61 (see FIGS. 6 and 10) that cooperates with the edge of a cutting table 62 over which the web of copy paper from the roll 25 is fed by the driven rollers 27, 28. The blade 61 is attached to a carrier plate 63 which slides in slots 64, of which only one is shown, at the opposite ends of a box-like knife housing 65 that spans and is secured to the side plates 52 of the copy transport sub-assembly 51. The carrier plate 63 is biased upwardly by a spring 64a which engages studs 65a on the carrier plate and which is secured at its center portion to the housing 65.

As a feature of the invention, the knife blade 61 is driven by a solenoid 66 through a linkage that produces a decreasing mechanical advantage as the knife is moved through its cutting stroke so that the load on the solenoid 66 is initially low and increases as the knife is operated. The solenoid 66 is mounted on one side wall of the housing 65 and its armature 67 is coupled by a link 68 to one set of toggle links 69 and 70 that interconnect the housing 65 with the carrier plate 63. The link 69 is pivoted on a stud 71 mounted on the housing 65 and is connected by a pin 72 to the link 70 which is pivoted by a pin 73 on the plate 63. A similar set of toggle links is located at the opposite end of the blade carrier plate 63 and a bar 74 connects the breaking pivot pins 72 of the two sets of toggle links. The link 69 is shaped as a bell crank and a pin 75 provides a pivotal anchoring point between the link 69 and the solenoid armature link 68.

In operation, it will be seen that energization of the solenoid 66 draws the armature 67 downwardly as seen in FIG. 10 so as to rock the link 69 about the pivot stud 71. This initially collapses the toggle links 69, 70 and, through the bar 74, the similar toggle links at the opposite end of the carrier plate 63. This initial movement of the armature 67 that first breaks the toggle links provides a high mechanical advantage driving the blade 61 in its cutting stroke. As the armature 67 approaches its fully drawn-in position and the links 69, 70 collapse, it will be seen that the mechanical advantage afforded by the linkage between the armature and the blade carrier plate 63 decreases so that the load on the solenoid reaches a maximum as the blade 71 approaches its final cutting position. As a result, the load on the solenoid quite closely approximates the capability of the solenoid to generate power, since the latter inherently increases during the stroke of the solenoid. This matching of the solenoid load to its power characteristics minimizes vibration and jar resulting from operation of the knife 30 and, hence, avoids disturbances which could affect the optical system 20 and interfere with the production of accurate, sharp copies.

Original transport sub-assembly

Turning now to the original transport sub-assembly 50, this unit includes side plates 80 having flanges 81 which carry the copy transport assembly 51 and on which are formed the tabs 54 and the notches 57 (see FIG. 3). The side plates 80 also have opposite end flanges 82 having notches which receive both a plurality of locating pins 83 fixed on the main frame 11 (see FIGS. 2 and 4) and three pivoted biased latches 84 also pivoted on the main frame 11. The two latches 84 on the same side of the machine are interconnected by a bar 85. In this way, the operator of the machine can grasp the original transport sub-assembly 50 about both side plates 80 and depress the opposite side latches 84 with one finger on each hand so as to release the sub-assembly and permit it to be withdrawn from the locating pins 83 and removed from the remaining portion of the machine. In repositioning the sub-assembly, the appropriate notches in the flanges 82 are guided over the locating pins 83 and the sub-assembly pushed against the main frame 11 so as to snap the latches 84 into their respective notches, thereby locking the sub-assembly in place.

The side plates 80 of the original transport sub-assembly 50 support, between them, the guide structure 43, the charging unit 31 and the driven roller pairs 33, 34; 35, 36; 44, 45; and 46, 47.

Pursuant to the invention, the sub-assembly 50 carries backup elements 87 and 88 on biased slides 89 and 90, respectively, so that, when the sub-assembly 50 is in operating position, the backup elements 87, 88 are biased toward the windows 21, 22, respectively. The windows 21, 22 are held in place by thin moldings 91 (see FIG. 14) which serve to space the respective backup elements 87, 88 from the windows and define therebetween copy paper and original sheet paths through the illuminating station 21 and the exposing station 22.

The slide 90 is carried in opposite wall brackets 92, of which only one is shown, and the backup member 88 is biased by wave springs 93 toward the window 22 (see FIG. 6). The slide 89 is slidably received by opposite wall portions 94 of the guide structure 43, and recessed coil springs 95 bias the backup member 87 toward the window 21 (see also FIG. 14).

As a feature of the invention, the guide structure 43 is formed of rigid, die cast, guide elements 101, 102, 103 and 104. The set of guide elements 101, 103 defines the original sheet path between the driven rollers 41, 42 and the rollers 44, 45. The other set of guide elements 102, 104 defines the closed loop recirculation path between the driven rollers 46, 47 and the rollers 44, 45. The guide elements 101, 102 are rigidly secured between the end walls 94 of the guide structure 43.

As a further feature of the invention, the original transport sub-assembly 50 includes a releasable sub-frame 105 defined by the guide elements 103, 104 which preferably are integrally formed (see FIGS. 6 and 9). By releasing and removing the sub-frame 105, both the original sheet path and the closed loop path are opened so that the machine can be easily inspected, cleaned and serviced should paper become jammed in the machine. The sub-frame 105 includes laterally extending pins 106 which are received within slots 107 formed in the side members 94 of the guide structure 43. The sub-frame 105 also carries a pair of wedging latches 108 (see FIGS. 3, 8 and 11) which are loosely pivoted in slots formed in brackets 109 secured to the sub-frame. The latches 108 thus float on the sub-frame and are effective to engage edges 110 on the side members 94 so that rotation of the latches 108 in a counterclockwise direction as seen in FIG. 11 causes camming surfaces 111 on the latches to force the guide element 104, and thus the sub-frame 105, securely into its operating position. As will be readily apparent, pulling the ends of the latches 108 forwardly of the machine releases the sub-frame 105 and permits the pins 106 to be slid from the slots 107 and the sub-frame removed from the sub-assembly 50.

With the sub-frame 105 in position, the guide structure 43 preferably defines a sharp bend in the closed loop path just in front of, or upstream of, the driven rollers 44, 45. The roller 44 thus serves as an abutment roller and the original sheet in being guided about the sharp bend has its leading edge abutted against the roller 44 as it is propelled through the guide structure 43. This abutment of the leading edge of the original sheet against the roller 44 tends to straighten the sheet should it be slightly misalined so that the entire edge simultaneously enters the nip of the rollers 44, 45 with the result that the original sheet is slightly straightened each time it passes between the rollers 44, 45. In this way, repeated recirculation of an original sheet does not multiply a slight error in alinement and, as a result, it has been found that original sheets recirculate indefinitely without becoming misalined or jamming within the guide structure 43.

For directing original sheets into either the closed loop recirculation path or the original return tray 17, a gate 115 is pivoted on a bracket 116 between the side plates 94 of the original copy sub-assembly 50 (see FIGS. 6 and 12). The gate 115 is shiftable between a position where the gate forms a portion of the closed loop recirculation path and a position allowing the original sheet beneath the gate from the illuminating station to the tray 17. With the gate in the solid line position shown in FIG. 6, the original is directed from the driven rollers 46, 47 back into the closed loop recirculation path defined by the guide elements 102, 104. Shifting of the gate 115 to the position shown in FIG. 12 allows the original sheet moving from the rollers 46, 47 to pass beneath the gate and out of the machine.

The gate 115 is provided with a lost motion actuator in the form of a solenoid 117 (see FIG. 4) wich is coupled by a spring 118 to an arm 119 secured to an extending portion of the bracket 116. Because of the lost motion afforded by the spring 118, should the solenoid 117 be energized to swing the gate 115 to its solid line position shown in FIG. 6 while an original sheet is passing beneath the gate, the gate simply rides idly on the sheet until the sheet clears the gate whereupon the gate assumes its full line position shown in FIG. 6. Thus, energization of the solenoid 117 before an original completely clears the machine does not damage the original or jam the machine.

Driving and sensing components

As a feature of the invention, the driving and sensing components of the machine 10 are arranged to facilitate separation of the several sub-assemblies from the machine as a whole. To this end, a main drive motor 125 is mounted on the main frame 11 and coupled by a drive belt 126 to both a main frame gear 127 and the developer unit 37 (see FIGS. 2 to 5). A pair of meshing gears 128 and 129 are mounted on the shafts of the respective rollers 44, 33, with the gear 128 being positioned so as to come into mesh with the frame gear 127 when the copy transport sub-assembly 50 is in operating position. The gear 128 thus drives the roller pair 44, 45 and, through a belt 130, also drives the roller pair 46, 47. The gear 129, meshing with the gear 128, drives the roller pair 33, 34 and, through a belt 131, also drives the roller pair 35, 36. The belt 130 is extended along the side of the copy transport sub-assembly 50 to a pulley driving a gear 132 positioned to mesh with a gear 133 on the copy transport sub-assembly 51 when the latter is in operating position. The gear 133 is on the shaft of the roller 41 so as to drive the roller pair 41, 42.

A solenoid actuated clutch mechanism is provided for driving the copy paper web feeding rollers 27, 28. The clutch includes a gear 135 mounted on the shaft of the roller 41 which meshes with a gear 136 of a gear pair that also includes a smaller gear 137. The gear pair 136, 137 is journalled on a bracket 138 that is pivoted about the shaft for the roller 41 (see FIGS. 4 and 5). A solenoid 140 is mounted on the side wall 52 of the sub-assembly 51 and connected through a spring 141 to the end of the bracket 138. Energization of the solenoid swings the bracket 138 upwardly as seen in FIG. 4 so as to bring the smaller gear 137 into mesh with a gear 142 carried on the shaft of the roller 27. With the solenoid energized, the gear 135 drives the roller pair 27, 28 through the gears 136, 137 and 142.

To sense the operation of the machine 10 and control its functions, a number of sensing switches are provided whose interrelationship will be discussed in more detail below. These switches include a sheet input switch 150

(see FIG. 6) having an operator overlying the original inlet table 15 so that the switch 150 is operated upon insertion of an original sheet into the machine. A door switch 151 (see FIG. 4) is mounted on the copy transport sub-assembly 51 so that the switch operator is contacted by the door 59 when the latter is in position. The switch 151 thus senses whether or not the door 59 has been closed.

The sub-frame 105 includes a box-like bracket 152 secured beneath the guide elements 103, 104 so as to carry and shield pairs of sheet activated switches. A pair of switches 153 and 154 are disposed in the original sheet path so as to be actuated by a sheet passing between the guide elements 101, 103. A second pair of switches 155 and 156 is provided in the recirculation loop so as to be contacted by sheets passing therethrough. All of the switches 153–156 are slidably mounted on the box-like frame 152 and adjusting screws 157 are provided, one for each switch, for accurately adjusting the position of the respective switches along the respective paths.

A knife switch 158 (see FIG. 3) is mounted on the knife housing 65 so as to be operated by the pin 75 when the solenoid 66 is energized and the knife blade pulled to the end of its stroke.

To interconnect the various electrical elements but still permit the sub-assemblies 50, 51 to be readily removed from the machine, all of the electrical leads are brought to a set of junction blocks 159 and 160 interconnecting the main frame 11 with the original transport sub-assembly 50 and another set of junction blocks 161 and 162 which electrically connect the sub-assemblies 50 and 51. These units may therefore be readily separated and the several electrical connections are disassociated by a simple unplugging action (see FIG. 4).

The dial structure

The dial mechanism 49 is provided for operating convenience in selecting the number of copies desired. The unit 49 includes a dial wheel 170 having a plurality of finger openings for rotating the wheel and its shaft 171 relative to a finger stop 172. In the illustrated example, the dial 170 is formed with ten finger openings, a "0" opening normally positioned adjacent the stop 172 and nine spaced openings corresponding to copies from two to ten. No provision for making one copy with the dial unit 49 is provided since a single copy is automatically produced by the machine 10 upon insertion of a sheet to be copied.

The dial shaft 172 carries a star wheel 173 which cooperates with a biased detent 174 that is effective to establish the alternate operating positions of the dial. A dial switch 175 is operated by an arm 176 attached to the dial shaft 170 with the arrangement being such that the switch 175 remains operated so long as the dial 170 is rotated away from its illustrated "0" position.

To step the dial back to its "0" position when it is rotated to select a desired number of copies, a solenoid 177 is coupled through a spring 178 to a slide 179 carrying a biased pawl 180 that is positioned to engage a ratchet 181 secured to the dial shaft 171. Each time the solenoid 177 is energized, it pulls the slide 179 downwardly in FIG. 15 so that the pawl 180 engages the ratchet 181 and steps the dial shaft 170 into the next detented position defined by the detent 174 and the star wheel 173. The number of solenoid pulses required to return the dial 170 to its "0" position depends, of course, upon the distance the dial is rotated by the operator in selecting the number of copies required.

Control circuit

Figure 20:
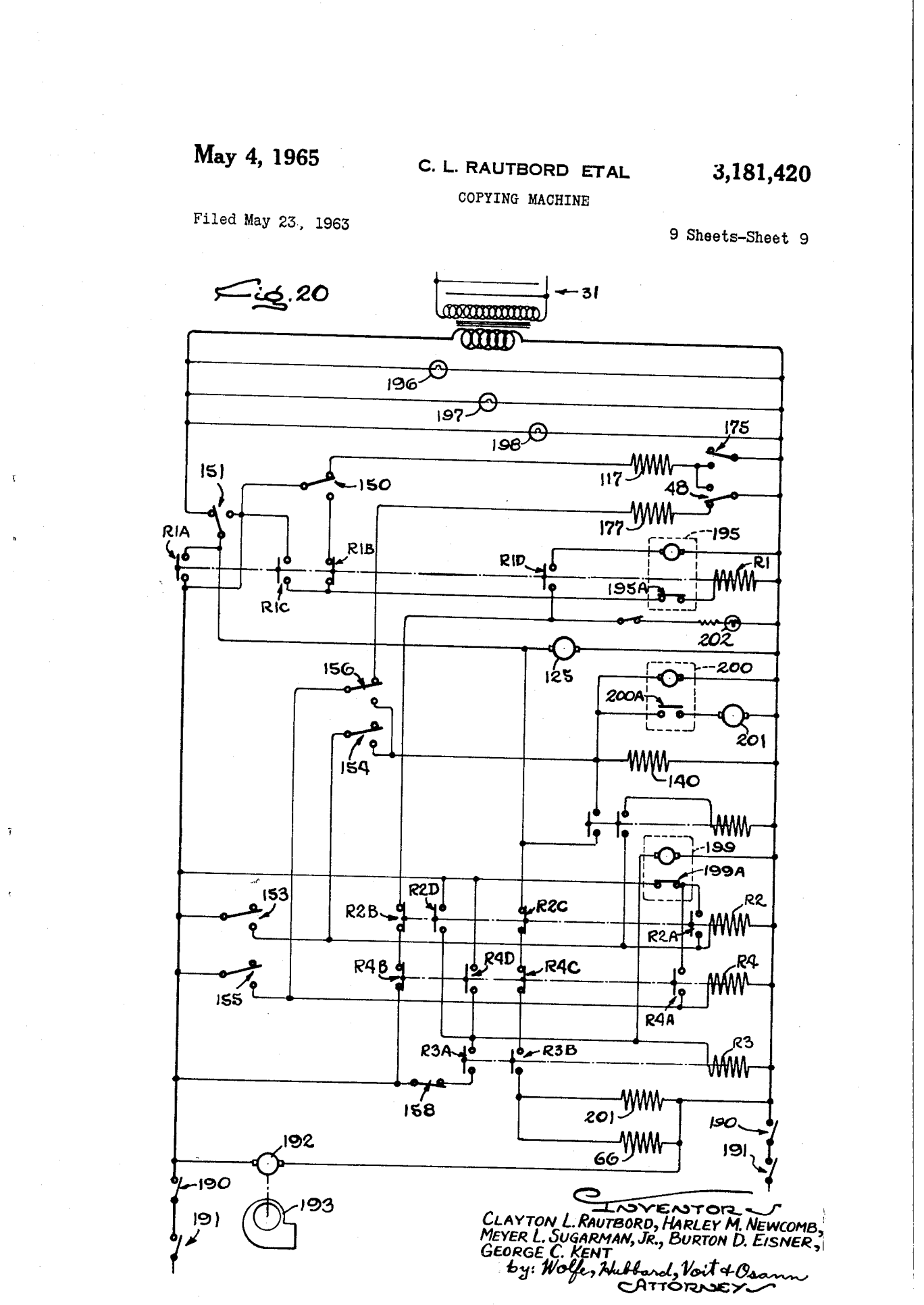

The control circuit for the machine 10, and the interrelation of the various electrical elements already described, can be best understood by going through some of the operating sequences with reference to the wiring diagram shown in FIG. 20.

It will first be assumed that a pair of housing interlock switches 190, not otherwise shown, are closed by the positioning of the housing 13 over the main frame 11 and onto the base 12 of the machine. The main power switch 191 (see FIG. 1) is then closed to energize the circuit. This turns on a motor 192 for a cooling blower 193, these parts not being otherwise shown.

Upon insertion of an original sheet to be copied into the machine over the table 15, the sheet input switch 150 is operated to energize a power relay R1 through the normally closed contacts R1B and 195A. The contacts 195A are a part of a run-out timer 195 to which further reference will be made below.

Upon energizing the relay R1, contacts R1C close before the contacts R1B open with the result that the relay seals in. The relay also closes contacts R1A which, assuming the door 59 is in place so as to hold the switch 151 in its illustrated position, energizes the charging unit 31, a pair of exposure lamps 196 and 197 forming a part of the optical system 20, and a fixer lamp 198 which forms a part of the fixer unit 38. The drive motor 125 is also energized through the contact R1A so that the original sheet, as it is pushed manually beyond the switch 150 into the nip of the rollers 41, 42, is thereafter fed mechanically through the machine.

The original sheet next operates the normally open switch 153 that energizes a copy relay R2 which picks up and seals in through its contacts R2A and the normally closed contacts 199A of a timer 199. Closing of the normally open relay contacts R2D energizes a knife relay R3 and the motor of the timer 199. The relay R3 is held in through its contacts R3A and the normally closed knife switch 158. The normally open relay contacts R3B also close to condition the knife solenoid 66 for operation, but the solenoid remains inactive since the copy relay contacts R2C are then open.

Closure of the switch 153 also directs current to the immediately adjacent switch 154 which is next operated and closed by the advancing original sheet. This energizes the copy paper feed clutch 140 so that the rollers 27, 28 begin feeding a web of paper from the roll 25 into and through the charging unit 31. Closure of the switch 154 also energizes a timer 200 which closes its contacts 200A for a predetermined time so as to drive a replenisher motor 201, not otherwise shown, that forms a portion of the developer unit 37.

The timer 199, in the illustrated construction, is a six-second timer which is effective to open its contacts 199A only after the timer has been energized for a period of six seconds. The purpose of this timer is to insure that at least a six inch length of copy paper will be fed into the machine before the web is severed by the knife 30. To illustrate this function, assume that an extremely short original having a length of only approximately four inches were fed into the machine. Such a short original would cause almost immediate reopening of the switch 153. Opening of this switch drops out the copy relay R2 so as to close the contacts R2C and thus energize the knife solenoid 66 through the then closed contacts R3B. Since the copy paper web feed rate is set to sever sheets of copy paper identical in length to the length of the original passing through the machine, this premature opening of the switch 153 would produce a four inch length of copy paper that would not track properly through the machine. However, it can be seen that the timer 199, by holding the contacts 199A closed until the six second timeout, prohibits dropping out of the copy relay R2 until six seconds have elapsed. This time period is selected since the copy paper feed is approximately one inch per second and the minimum interval established by the timer 199 thus insures that at least a six inch length of copy paper will travel through the machine.

Returning to the operating sequence being described, both of the switches 153 and 154 have been operated so that the copy paper feed clutch solenoid 140 is energized.

Thus, the original is moving downwardly past the illuminating station adjacent the window 21 and the copy paper is moving upwardly through the exposing station adjacent the window 22. The next thing that happens is that the trailing edge of the original clears the switch 153 which assumes its normally open condition. This drops out the copy relay R2 and, assuming that the original is more than six inches in length so that the timer 199 has previously opened the contacts 199A, causes the relay R2 to drop out. The contacts R2D open but the knife relay R3 remains energized through the switch 158 and the contacts R3A. However, the contacts R2C close so as to energize the knife solenoid 66 and thus immediately sever the moving length of copy paper from the roll 25. As soon as the blade 61 of the knife 30 reaches the end of its stroke, the switch 158 is operated and opened so as to drop out the knife relay R3 and thereby, through opening of the contacts R3B, deenergize the knife solenoid 66.

Preferably, a copy counter 201 is energized concurrently with the knife solenoid 66 so as to provide a record in the machine of the number of copies made.

Dropping out of the copy relay R2 also closes contacts R2B of this relay so as to energize an indicator lamp 202 which signals the operator that the original previously fed into the machine has "cleared" so that an additional original can be inserted without overlapping. Closing of the contacts R2B also energizes the run-out timer 195 through then closed contacts R1D. The timer 195, through its normally closed contacts 195A, insures that the power relay R1 will remain energized for a period sufficiently long to permit the original sheet and the copy to completely clear the machine. This interval may be in the order of approximately twenty-five seconds and, when the run-out timer 195 times out and opens the contacts 195A, the power relay R1 is deenergized so as to turn off the drive motor 125, the charging unit 31, the exposure lamps 196, 197 and the fixer lamp 198.

Finally, it will be understood that when the original clears the switch 154, it assumes its normally open position so as to deenergize the copy feed clutch solenoid 140.

This completes the description of the machine's operation when making single copies.

In order to make multiple copies, either the continuous copy switch 48 is operated or the dial mechanism 49 is manipulated so as to effect the closing of the dial mechanism switch 175. An original is then fed into the machine over the table 15 and the sequence as described above in connection with making single copies occurs.

That is, the switch 150 is operated to energize the power relay R1 and turn on the drive motor 125, the charging unit 31 and the several lamps 196–198. The switch 153 is next closed energizing the copy relay R2, starting the timer 199 and picking up the knife relay R3. The switch 154 is next operated so as to energize the replenisher motor 201 together with its timer 200 and also to energize the solenoid 140 so as to engage the copy clutch to begin the feeding of the copy paper.

When the tail of the original sheet passes the switch 150, it is restored to its original illustrated position so as to complete a circuit to the gate operating solenoid 117 through either the switch 48 or the switch 175 depending upon which has been operated for the making of multiple copies. The power relay R1 remains energized through its contacts R1C.

With the gate solenoid 117 energized, the leading edge of the original sheet strikes the gate and is passed back into the recirculation path defined between the guide elements 102, 104. The end of the original thereafter clears the switches 153, 154 and the cycle is completed as in making a single copy with the relay R2 being deenergized to actuate the knife solenoid 66 and the counter 201. Opening of the switch 154 also deenergizes the copy feed clutch solenoid 140 so that feed of the copy paper is interrupted even though the original has been directed into the recirculation path. There is thus no copy paper fed during the "gap" in the recirculation path but rather the copy sheets continue to be cut in lengths exactly duplicating the length of the original.

The original sheet, now moving in the recirculation path, next operates and closes the normally open switch 155 so as to energize a recirculation relay R4 that plays much the same role as the copy relay R2. Picking up of the relay R4 closes its contacts R4A so as to seal in the relay and closure of the contacts R4D energizes the knife relay R3. Contacts R4C are opened upon pickup of the recirculation relay R4 so as to prevent immediate cutoff of the copy paper.

Closure of the switch 155 also completes a circuit through the switch 156 before the latter is contacted by the advancing original sheet that is effective to energize or pulse the dial solenoid 177. This steps the dial mechanism one notch in the manner described above. Almost immediately thereafter, the switch 156 is operated by the advancing original sheet so as to deenergize the dial solenoid 177 and complete a circuit to the copy paper feed clutch solenoid 140 with the result that the copy paper is again fed through the charging unit 31.

The original sheet continues to pass through the recirculation path until its tail end clears the switch 155 so as to open this switch and drop out the recirculation relay R4. Deenergization of this relay causes closure of the contacts R4C so as to energize the knife solenoid 66 and the counter 201, thereby severing a sheet of copy paper having the required length. Completion of the knife blade stroke again opens the switch 158 so as to deenergize the relay R3 and thereby deenergize the knife solenoid 66 and the counter 201.

Deenergization of the recirculation relay R4 also closes contacts R4B which illuminates the indicator lamp 202 and energizes the run-out timer 195. These devices do not serve a directly useful purpose during the making of multiple copies but they do indicate when a fresh original can be inserted after the last copy in the series has been cleared.

The indicator lamp 202 remains on only for a very short time since the original sheet in the recirculation path quickly reoperates the switch 155 after its tail end has cleared the switch. However, should the operator take the flash of the lamp 202 as a signal for insertion of a fresh copy, the recirculation gate solenoid 117 is immediately deenergized upon insertion of a second original to operate the switch 150, and thus the originals are ejected from the machine even though the switch 48 remains operated or the dial mechanism continues to call for additional copies. Improper jam-ups or improper copies are avoided.

It will be noted that the dial pulse solenoid 177 is in series with the switch 155 and, hence, this solenoid is never energized unless there is an original in the recirculation path. This is desirable since there is no "1" position on the dial mechanism and the solenoid 177 is thus blocked out during the making of single copies so that stepping of the dial mechanism and future miscounts are prevented.

Returning to the function of making multiple copies with a single original, when the dial mechanism 49 has been stepped around to its "0" position so as to open the switch 175, the solenoid 117 for the gate 115 is deenergized so that the original, when the last pass through the illuminating station adjacent the window 21 is made, is discharged from the machine. So long as a count remains on the dial mechanism 49, or so long as the switch 48 remains operated, the machine will continue to make copies of the same original with the switches 155 and 156 being operated in sequence in the manner described above.

The above-described circuit embodies a number of operating and safety features. Overlapping of an original in the recirculation path is prevented by disabling the gate solenoid 117 until the end of the original clears the switch 150. If an original that is too long for the recirculation path is presented to the machine, the gate 115 remains in its "open" position until the leading edge of the original has already begun to emerge from the machine. In other words, the spacing of the switch 150 from the gate 115 defines the maximum length of an original which can be directed into the recirculation path, and this spacing is set to insure that originals too long for the recirculation path are not sent into that path.

The timer 199, in the manner described above, insures that a minimum length of copy paper is directed into the machine, this minimum length being on the order of six inches in the illustrated construction.

The relatively close spacing of the drive rollers 41, 42; 44, 45; and 46, 47 permits an original as short as four inches to pass safely through the machine although, of course, the copy of such an original will be of a six inch length. To minimize the likelihood of jamming, originals shorter than four inches should preferably be placed between longer transparent carrier sheets.

Should the operator desire to change the number of copies while the machine is cycling in the multiple copy mode, the dial mechanism 49 can simply be reset either forward or backward and the machine will produce a number of copies corresponding to the last set number. Returning the dial to the "0" position simply opens the switch 175 and, upon completion of the copy making cycle then in progress, the machine will turn itself off following timeout of the timer 195.

It will be appreciated that wastage of copy paper is avoided. Copy paper sheets are cut from the roll 25 by sensing both the front and the rear edges of the original sheet being copied so that the copies assume the size of the original. The same mode of operation is carried through even when multiple copies are being made so that there is no copy paper wastage during the "gap" between the trailing and leading edge of an original being recirculated.

Preferably, the roll 25 has a transverse dimension approximately equal to the length of the original sheet being copied which, in the case of letterheads, is eleven inches. The original sheets are fed sideways into the machine. If shorter or longer pages are being copied, a roll of copy paper of corresponding width is provided.

Upon insertion of an original, the dial mechanism 49 or the multiple copy switch 48 can always be immediately operated to produce multiple copies and the original sheet will move into the recirculation path so long as its leading edge has not yet passed the gate 115. However, if the original has moved past the gate, energization of the gate solenoid 117 will simply cause the gate to ride along the original as it is being expelled from the machine and the operator will merely have to reinsert the original to produce the desired number of copies.

*Cut sheet feed*

As a further feature of the invention, the machine 10 may provide for receiving separate sheets of copy paper as well as copy paper from the roll 25. In the embodiment shown in FIGS. 17 to 19, a fragment of a machine 10a is shown in which parts corresponding to those found in the machine 10 have been given the same reference numeral with the distinguishing suffix "a" added.

The machine 10a includes an original inlet table 15a over which original sheets for copying are passed into the bite of driven rollers 41a and 42a. The rollers 41a, 42a are journalled in a copy transport sub-assembly 51a which also provides for the mounting of a roll of copy paper 25a and a pair of driven copy paper feed rollers 27a and 28a.

The machine 10a also includes a folded plate 210 which defines a slot above the table 15a for insertion of original sheets and also a surface 211 for guiding sheets into the copy paper path between the driven rollers 27a, 28a. A shiftable element 212 is mounted above the surface 211 so as to be movable from a first position, illustrated in FIG. 17, shielding the surface 211 and a second position, illustrated in FIG. 18, spaced from the surface 211 so as to define a copy paper sheet inlet path to the copy paper rollers 27a, 28a. The element 212 carries laterally projecting pins 213 which ride in slots 214 formed in side plates 215 that rigidly support the folded plate 210. The element 212 is shifted between its two alternate positions by simply sliding the pins 213 along the slots 214. Preferably, a detent notch 216 is formed in one of the slots 214 so as to define a limit position for the element 212.

With the element 212 in its FIG. 17 position, the element clears the web drawn from a copy paper roll 25a so that the machine can be used in the manner described above in connection with the machine 10.

Upon shifting the element 212 to its alternate, FIG. 18 position, the copy paper slot above the surface 211 is open so that an original sheet 218 and an overlying piece of copy paper 219 can be inserted into the machine, the original sheet passing over the table 15a and the copy paper sheet being slid inwardly over the surface 211.

*Summary of features*

The copy machine 10 embodies easily separable sub-assemblies including the copy transport sub-assembly 51, the original transport sub-assembly 50 and the sub-frame 105. The electrical connections between these parts are through readily separable plugs. The mechanical drive is achieved through intermeshing gears which do not interfere with ready separability but which permit positive drive to be established with the sub-assemblies in place. Removal of the sub-frame 105 at once exposes both the original sheet path and the recirculation path for inspection and servicing.

The optical system 20, which in a sense is the heart of the machine, is provided with fixed windows 21 and 22 that define the illuminating station and the exposing station respectively. Thus, an extremely accurate focus can be established within the optical system which is reliably maintained, even though the sub-assembly 50 can be readily separated from the windows 21, 22.

The die cast members of the guide structure 43 provide extremely rigid and accurate paths for conveying the original sheet through the machine. These elements give a solid mounting for the several switches associated with the original sheets, and the rigidity of the construction minimizes the possibility of distortion and resulting jamming of originals in the machine. Moreover, this rigidity facilitates separation of the sub-frame 105.

The machine 10 is capable of endlessly repeating the copy making procedure so long as the supply of copy paper lasts. This reliability in the repeat mode of operation is attributed to the rigid, accurate guide structure 43 and also to the provision of the sharp bend just before the nip of the rollers 44, 45 which tends to straighten the original sheet each time it passes through the illuminating station.

The linkage between the solenoid 66 and the knife blade 61 contributes to the quality of the copies made by the machine 10 since this linkage proportions the operating load in operating the knife to the characteristics of the solenoid, with the result that a smoother action is obtained without vibration which could disturb the optical system of the machine.

By sensing both the leading and trailing edge of the original sheets, lengths of copy paper are cut to equal the lengths of copy paper are cut to equal the length of the original being copied so that there is no waste. As a safety feature, a minimum length of copy paper is established so that no loss of control is encountered as the copy paper sheets are moved upwardly through the developing unit 37 and the fixing unit 38.

The control circuit also obviates "wrap around" of an original sheet through the recirculation path by causing the siwtch 150 to prevent operation of the recirculation gate 115 if an overlong original is presented to the machine. However, if the operator manipulates the machine's controls so as to actuate the gate 115 while an original sheet is passing out of the machine, the gate rides idly over the original because of the lost motion connection between the gate solenoid 117 and the gate itself.

It will also be seen that the door switch 151 is arranged in the control circuit so as to deenergize the charging unit 31 and the lamps 196–198 upon opening of the housing door 59. This operating feature is convenient in putting the machine in service and as an emergency disablement of the high voltage charging unit 31 and the lamps 196–198 should there be some manifestion of difficulty within the machine.

The dial mechanism 49 provides a reliable and conveniently understood arrangement for conditioning the machine for the making of a selected number of multiple copies.

Optionally, the structure illustrated in connection with the embodiment of the machine 10a can be utilized to permit the feeding of separate cut sheets of copy paper as well as providing the machine with a roll of copy paper.

We claim as our invention:

1. In an electrophotographic copying machine, the combination comprising, an optical system including an exposing station and an illuminating station from which images are projected to the exposing station, a first set of guides and driven rollers defining a copy paper path through said exposing station, means including a roll of copy paper for delivering a web of copy paper to said copy paper path, a knife in said copy paper path for severing sheets from said web, a second set of guides and driven rollers defining an original sheet path through said illuminating station, means defining, together with at least a portion of said second set of guides and rollers, a closed loop path for recirculating an original sheet back through said illuminating station, and means including sensing elements in both said original path and said closed loop path for severing said web into copy paper sheets in lengths equal to the length of the original sheet as it moves into and through said illuminating station.

2. In an electrophotographic copying machine, the combination comprising, an optical system including an exposing station and an illuminating station from which images are projected to the exposing station, a first set of guides and driven rollers defining a copy paper path through said exposing station, means including a roll of copy paper for delivering a web of copy paper to said copy paper path, a knife in said copy paper path for severing sheets from said web, a second set of guides and driven rollers defining an original sheet path through said illuminating station, means defining, together with at least a portion of said second set of guides and rollers, a closed loop path for recirculating an original sheet back through said illuminating station, and means including sensing elements in said original sheet path for severing sheets of copy paper in the copy paper path into lengths equal to the length of original sheets in the original sheet path, said last named means including a device for establishing a minimum length for copy paper sheets regardless of the length of the original sheet that is sensed.

3. In an electrophotographic copying machine, the combination comprising, an optical system including an exposing station and an illuminating station from which images are projected to the exposing station, a first set of guides and driven rollers defining a copy paper path through said exposing station, a second set of guides and driven rollers defining an original sheet path through said illuminating station, and means defining, together with at least a portion of said second set of guides and rollers, a closed loop path for recirculating an original sheet back through said illuminating station, a gate element forming a portion of said closed loop path when in one position and being shiftable so as to open said path and allow an original sheet to be discharged therefrom, and means including a sensing element in said original sheet path for shifting said element to said one position when said element does not sense an original sheet, said sensing element being spaced from said gate element along said original sheet path a distance slightly less than the distance around said closed loop path so as to prevent overlong original sheets from being directed into the closed loop path.

4. In an electrophotographic copying machine, the combination comprising, an optical system including an exposing station and an illuminating station from which images are projected to the exposing station, a first set of guides and driven rollers defining a copy paper path through said exposing station, a second set of guides and driven rollers defining an original sheet path through said illuminating station, and means defining, together with at least a portion of said second set of guides and rollers, a closed loop path for recirculating an original sheet back through said illuminating station, a gate element forming a portion of said closed loop path when in one position and being shiftable so as to open said path and allow an original sheet to be discharged therefrom, and means including a sensing element in said original sheet path for shifting said gate element to said one position when said sensing element does not sense an original sheet, said sensing element being spaced from said gate element along said original sheet path a distance slightly less than the distance around said closed loop path so as to prevent overlong original sheets from being directed into the closed loop path, said gate element having a lost-motion actuator for shifting the gate element so that the gate element rides idly on a passing original sheet if shifted to said one position while the sheet is moving past said gate element.

5. In an electrophotographic copying machine, the combination comprising, an optical system including an exposing station and an illuminating station from which images are projected to the exposing station, a first set of guides and driven rollers defining a copy paper path through said exposing station, a second set of guides and driven rollers defining an original sheet path through said illuminating station, and means defining, together with at least a portion of said second set of guides and rollers, a closed loop path for recirculating an original sheet back through said illuminating station, said second set of guides and rollers including an abutment roller arranged immediately before said illuminating station, and said means creating a sharp bend in said closed loop path immediately before said abutment roller so that the leading edge of original sheets in the closed loop path abut said roller and straighten prior to being passed through the illuminating station.

6. In an electrophotographic copying machine, the combination comprising, a main frame, an optical system including a pair of spaced windows mounted in said frame defining an exposing station and an illuminating station, a sheet transport subassembly releasably locked on said frame and having a first backup element biased against said exposing station window so as to define a copy paper path therebetween, and a second backup element biased against said illuminating station window, said transport subassembly including one set of guide elements defining an original sheet path leading between said illuminating station window and the element thereon and a second set of guide elements defining a closed loop path for recirculating sheets from the illuminating station window back to said original sheet path, and said subassembly including a subframe releasable therefrom and supporting guide elements from each of said sets so as to open both said original sheet path and said closed loop path upon removing the subframe from the sheet transport subassembly.

7. The combination of claim 6 in which said guide elements are formed as rigid die castings, and including sensing elements and switches controlled thereby for sensing sheets in both the original sheet path and the closed loop path, said sensing elements and switches being mounted on said releasable subframe.

References Cited by the Examiner
UNITED STATES PATENTS

| | | | |
|---|---|---|---|
| 2,585,276 | 2/52 | Schubert | 88—24 |
| 2,741,960 | 4/56 | Oldenboom | 95—1.7 |
| 3,051,568 | 8/62 | Kaprelian | 95—1.7 X |
| 3,075,493 | 1/63 | Cerasani et al. | 95—1.7 X |
| 3,088,386 | 5/63 | Sugarman | 95—1.7 |
| 3,091,169 | 5/63 | Taini et al. | 95—77.5 |
| 3,143,947 | 8/64 | Limberger | 95—75 |

EVON C. BLUNK, *Primary Examiner.*